US000001066H

United States Statutory Invention Registration [19]

[11] Reg. Number: H1066

[43] Published: Jun. 2, 1992

Petropoulos et al.

[54] AIRBORNE INFRARED TRANSMISSOMETER

[75] Inventors: Spyros K. Petropoulos, Ashton; Abraham Hirschman, deceased, late of Silver Spring, both of Md.; William J. Hirschman, co-executor, Larchmont; Samuel Hirschman, co-executor, Flushing, both of N.Y.

[73] Assignee: The United States of America as represented by the Secretary of the Navy, Washington, D.C.

[21] Appl. No.: 553,059

[22] Filed: Jul. 16, 1990

[51] Int. Cl.[5] ..... G01N 21/25; G01N 21/59

[52] U.S. Cl. ..... 250/338.5; 250/573; 340/961; 356/437

[58] Field of Search ..... 250/573, 338.5; 356/437; 340/961, 963

[56] References Cited

U.S. PATENT DOCUMENTS

| | | | |
|---|---|---|---|
| 3,917,957 | 11/1975 | Ansevin et al. | 250/573 |
| 3,986,023 | 10/1976 | Früngel | 250/239 |
| 4,277,170 | 7/1981 | Miles | 340/961 |
| 4,469,443 | 9/1984 | Geller | 356/437 |
| 4,755,818 | 7/1988 | Conrad | 340/963 |
| 5,028,129 | 7/1991 | Smith | 356/437 |

FOREIGN PATENT DOCUMENTS

| | | | |
|---|---|---|---|
| 109845 | 6/1984 | Japan | 250/338.5 |
| 175648 | 8/1987 | Japan | 250/338.5 |

OTHER PUBLICATIONS

Ludwig et al., "Air Pollution Measurements from Satellites", NASA CR-2324, Nov. 1973.

*Primary Examiner*—Bernarr E. Gregory

*Attorney, Agent, or Firm*—John D. Lewis; Kenneth E. Walden

[57] ABSTRACT

The Airborne Infrared Transmissometer measures the infrared transmission between a test target aircraft and a detection system. A transmitter is attached to an aircraft and emits a calibrated infrared beam. A ground-based, shipborne, or airborne receiver measures the transmitted signals in the exact same path between the target aircraft and the detection system. Data recording equipment can be attached to both the transmitter and receiver to measure the associated outputs.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIRBORNE INFRARED TRANSMISSOMETER

BACKGROUND OF THE INVENTION

The invention relates to instruments for measuring the atmospheric transmission along a measurement path and, in particular for measuring the atmospheric transmission in the 3–5micrometer infrared spectral region between a flying aircraft and a ground-based, shipborne, or airborne infrared detection station.

Transmissometers are devices used to measure the transmissivity along a specific path. The basic components of a transmissometer are a transmitter and a receiver. The transmitter transmits a calibrated beam of electromagnetic radiation to the receiver and the output of the receiver is monitored to determine the degree of attenuation of the radiation beam.

Transmissometers have been used in various applications such as monitoring smoke stack emissions, calculating mass concentrations, determining the visibility at airports, and determining infrared transmissions along various paths, etc. Infrared transmissometers were normally limited to performing such measurements along horizontal or slant paths, where the transmitter and receiver are stationary in position. They were incapable of accurately measuring the infrared atmospheric transmission along a path between a flying aircraft and a detection station, a measurement which is of paramount importance to the U.S. Government.

It is also very important to perform such measurements simultaneously with other tests being conducted on the test target aircraft where the system under test is an Infrared Search and Track (IRST) system, a Forward Looking Infrared (FLIR), or an infrared missile seeker. The importance of the subject transmissometer derives from the fact that when newly developed infrared detection systems, such as IRSTs, FLIRs or infrared missile seekers, are being tested against moving targets, the infrared transmission of the atmospheric path between the system under test and the test targets must be accurately measured. Only then can the performance of the device being tested be fully quantified.

OBJECTS OF THE INVENTION

An object of the invention is to accurately measure the atmospheric transmission in a certain infrared spectral region in the same path between a test target aircraft and a ground-based, shipborne, or airborne detection station.

Another object of the invention is to perform such measurement simultaneously with other tests being conducted on the test target aircraft.

SUMMARY OF THE INVENTION

The Airborne Infrared Transmissometer (AIRT) measures the atmospheric attenuation between a test target aircraft and a detection system, a measurement which was previously incapable of being performed. The AIRT comprises a transmitter which is attached to the pod station of an aircraft and a ground-based, shipborne, or airborne receiver. Additionally, data recording equipment can be attached to both the transmitter and the receiver to record the associated inputs and outputs. The transmitter is housed in a modified Electromagnetic Support System (ESS) Navy pod which is attached to the pod station on the test target aircraft. The transmitter source is a very accurately controlled and stable infrared lamp, which, in conjunction with focusing optics, produces a calibrated radiation beam. The transmitted radiation beam is chopped and scanned azimuthally past the receiver. A Ram Air Turbine Generator provides the electrical power for the transmitter.

The receiver is basically an infrared radiometer capable of measuring incident chopped radiation within a certain band of the electromagnetic spectrum.

DETAILED DESCRIPTION OF THE INVENTION

FIG. I is a simple depiction of the use of the AIRT where a shipborne IRST system is undergoing test and evaluation using an aircraft as a test target. The transmitter 1 is attached to a pod station on the aircraft. The receiver 2, located on the ship, measures the transmitted signals in the exact same path between the aircraft and the ship. Since the magnitude of the transmitted signals is accurately known and the receiver is calibrated, the transmission of the atmospheric path between the aircraft and the ship can be measured. The measurement can be performed simultaneously with other tests being conducted on the object under test, such as the IRST 3 system, for which the aircraft serves as a target to be detected.

Figure 2:
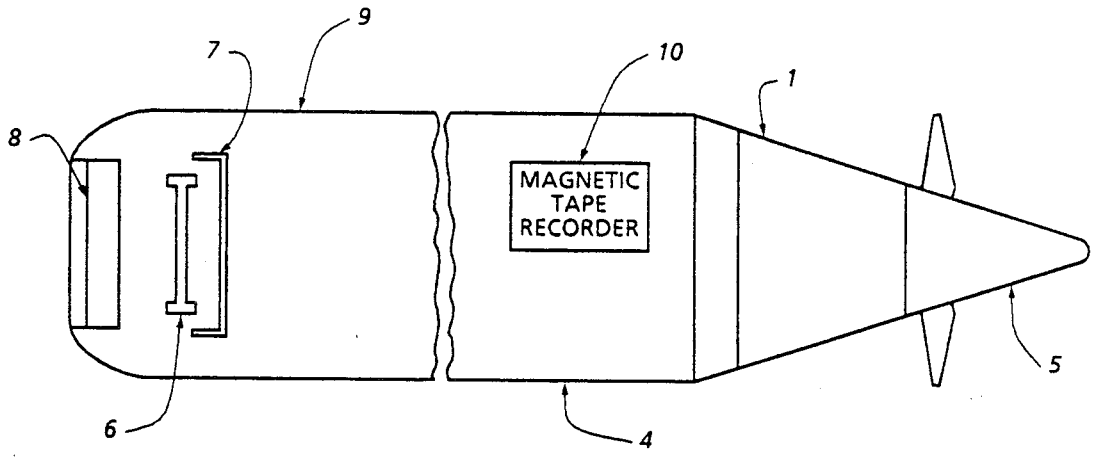
FIG. 2 shows the physical configuration of the transmitter attached to a pod station on the aircraft shown in FIG. 1.

The AIRT comprises a transmitter located on the test target aircraft and a ground-based, shipborne, or airborne receiver. Additionally, data recording equipment can be attached to the transmitter and receiver to record the transmitted signals of the transmitter or the signals received by the receiver, plus time signals. Referring to FIG. 2, the transmitter 1 comprises a modified ESS Navy pod 4, a Ram Air Turbine Generator 5, an accurately controlled and very stable infrared reference source 6, a scanning parabolic mirror 7, a silicon window 8, and associated electronics. A rotating cylindrical chopper 9 of the infrared source is also shown in FIG. 2. The cylindrical chopper 9 contains slots and rotates at a given frequency. The frequency and the number of slots can be varied so long as the rotating frequency multiplied by the number of slots equals 100 Hz. Additionally, there can be a suitable magnetic tape recorder 10 for recording the output signal of the monitoring sensor, shown in block diagram form in FIG. 2.

The monitoring signal is produced by a thermoelectrically cooled lead selenide cell looking directly at the infrared reference source 6. The infrared source 6 operates at a color temperature of 1650 degrees C. The infrared source 6, together with the associated optics, produces a calibrated radiation beam which is scanned along the azimuthal direction with a unidirectional period of 0.7 seconds. The cylindrical chopper 9 chops the infrared beam at 100 Hz.

Once the transmitter 1 is mechanically attached to the pod station on the aircraft, no other interfacing between the pod and aircraft is necessary. The Ram Air Turbine Generator 5 produces the required electrical power for the transmitter 1. The total weight of the transmitter 1 is approximately 320 pounds.

Figure 1:
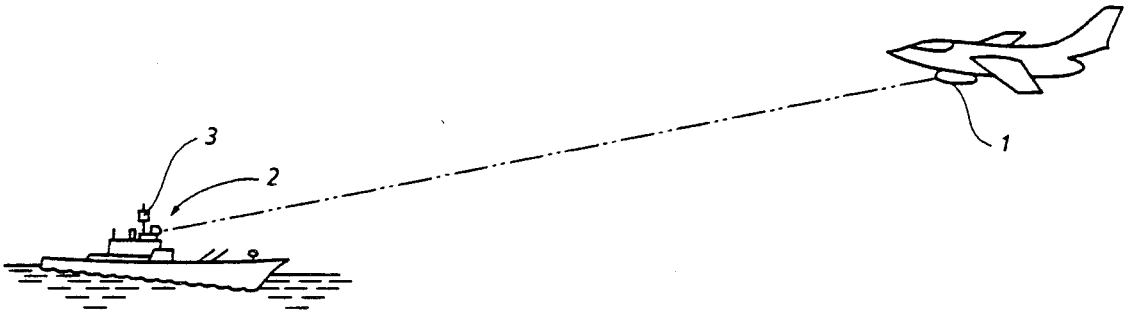
FIG. 1 is a depiction of the AIRT transmitter/-receiver geometry for a test target aircraft and a shipborne detection station.
Figure 3:
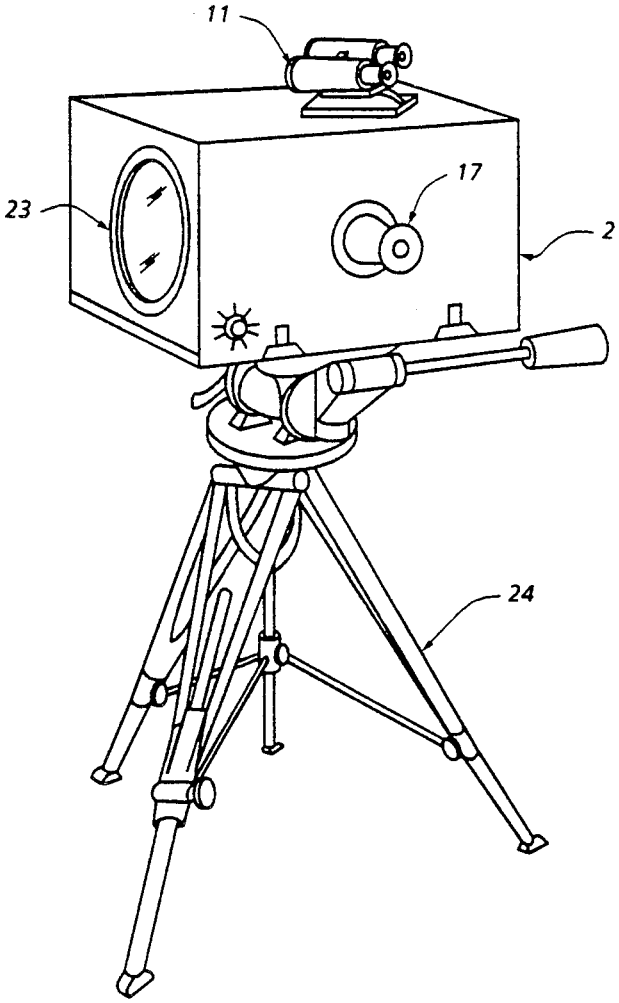
FIG. 3 shows the AIRT receiver mounted on a pan-and-tilt tripod which can be used for the shipborne detection station in FIG. 1.

The infrared receiver 2 in FIG. 3 is basically an infrared radiometer capable of measuring incident radiation within a certain spectral band, provided that the radiation intensity is amplitude modulated with a frequency of 100±5 Hz. The receiver 2 is specially configured to operate in conjunction with the infrared transmitter 1. For a ground-based or shipborne operation the receiver 2 can be mounted on a pan-and-tilt tripod 24 since aiming at the target is manual. Target acquisition can be done visually, aided by a ten degree field-of-view telescope 11 which is mounted on the receiver 2. The boresighting lens 17 is necessary to align the detector 15 in FIG. 4 with the telescope 11. The entrance aperture 23 also serves as a protective window. For an airborne operation, the receiver should be mounted in a suitable pod or turret attached to a wing of the host aircraft. Target acquisition in this case would have to be done with the help of radar or the infrared system under test.

Figure 4:
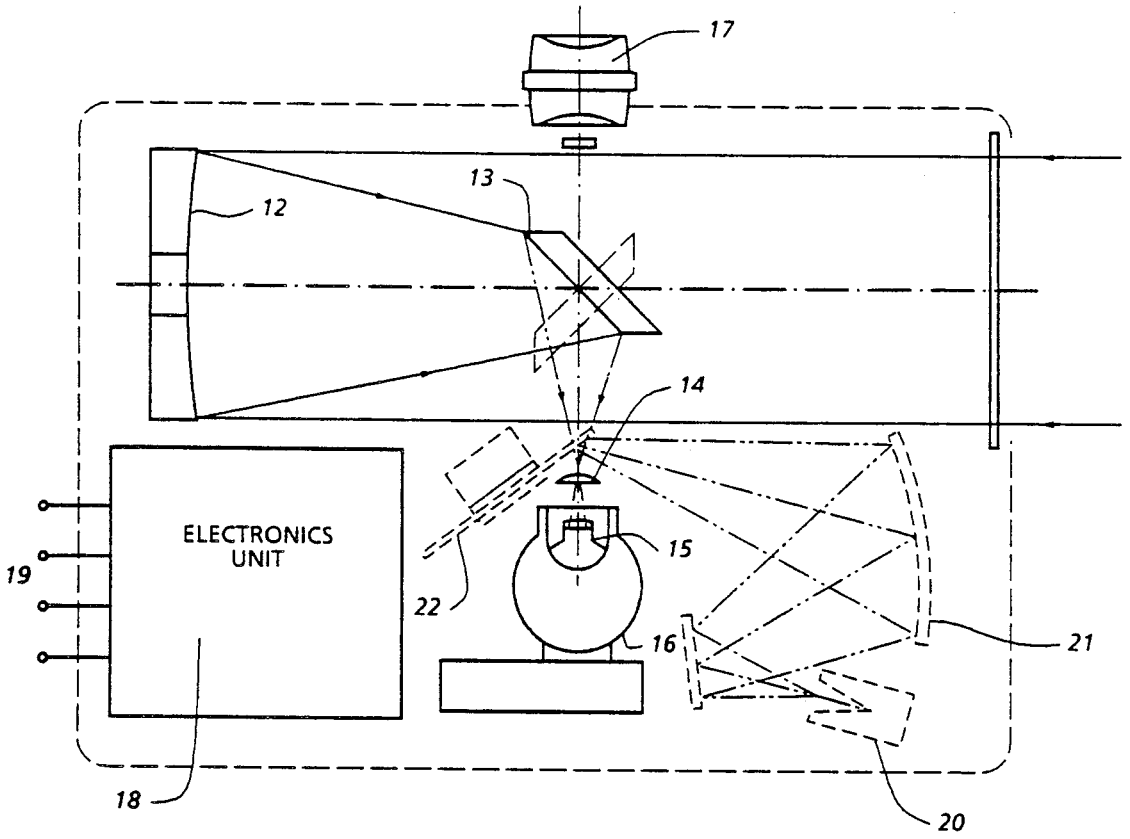
FIG. 4 shows the optical configuration of the AIRT receiver in FIG. 3.

Referring to FIG. 4, the operation of the receiver can be described in the following manner. A ten inch focal length, five inch diameter Newtonian telescope 12 is focused at infinity. The secondary mirror 13 of the telescope is motor driven. When the secondary mirror 13 is in the position shown by the solid lines, it reflects the incoming radiation through a field stop and field lens 14 onto an infrared detector 15 which is cooled by a liquid nitrogen dewar 16. When the secondary mirror 13 is in the position shown by the dotted lines, it reflects the incoming radiation through an eyepiece lens 17 onto an observer. This arrangement is necessary for boresighting the infrared detector 15 and its associated optics with the telescope 11 shown in FIG. 3. The output signal of the detector 15, after amplification and conditioning by electronics unit 18, is obtained from four signal (voltage) outputs 19 via BNC connectors. These four outputs have one of the following gains: 1; 10; 100; 1000. These four gains provide a greater signal dynamic range at all times. They ensure that the incoming infrared signals produced by the transmitter and processed by the receiver will appear with satisfactory strength for recording at, at the least, one of the four BNC connectors.

The only power required to operate the receiver is 110 V, 60 Hz. The weight of the receiver is approximately 30 pounds. Additionally, a blackbody reference source 20, associated optics 21, and a chopper 22 for convertinq the AIRT into an absolute radiometer can be added to the receiver. Recording of the receiver output signals may be done with a four-channel magnetic tape recorder. Alternatively, the four output signals can be multiplexed and recorded on one channel.

What is claimed is:

1. A device for measuring infrared radiation transmission in the changing path between a moving test target aircraft and a ground based, shipborne, or airborne detection station, comprising:

means for transmitting a calibrated infrared beam from the test target aircraft; means for measuring infrared radiation from said means for transmitting, said means for measuring infrared radiation located on the ground-based, shipborne, or aircraft detection station.

2. The device of claim 1, wherein said transmitting means comprises an infrared source which produces an infrared radiation beam, a scanning parabolic mirror which scans said infrared radiation beam along the azimuthal direction with a period of 0.7 seconds, and a cylindrical chopper which chops said infrared radiation beam at 100 Hz.

3. The device of claim 1 wherein said means for measuring comprises an infrared radiometer capable of measuring incident radiation amplitude modulated with a frequency of 100± Hz within a certain spectral band.

4. A device for measuring infrared radiation transmission in the moving path between a moving test target aircraft and a ground based, shipborne, or airborne detection station, comprising:

a transmitter which produces a calibrated infrared radiation beam which is scanned azimuthally;

means for providing electrical power to said transmitter;

means for receiving and measuring incident radiation from said transmitter located on the ground-based, shipborne, or airborne detection station;

means for aligning said means for receiving and measuring with said transmitter while the path between said transmitter and said means for receiving and measuring is changing;

means for recording signals from said transmitter and said means for receiving and measuring.

5. The device of claim 4 wherein said transmitter is encased in a modified Electromagnetic Support System Navy pod.

6. The device of claim 4 wherein said transmitter power providing means is a ram air turbine generator.

7. The device of claim 4 wherein said receiving aligning means is a pan and tilt tripod which houses said receive.

8. The device of claim 4 wherein said recording means is a magnetic tape recorder.

* * * * *